June 10, 1969  A. SCHÜLE  3,448,766

CHECK VALVE

Filed June 22, 1965

INVENTOR
Albert Schüle

BY
Michael J. Striker

United States Patent Office 3,448,766
Patented June 10, 1969

3,448,766
CHECK VALVE
Albert Schüle, Niklaus von Flue-Strasse 41,
Basel, Switzerland
Filed June 22, 1965, Ser. No. 465,885
Claims priority, application Switzerland, June 23, 1964,
8,195/64
Int. Cl. F16k 15/00, 21/04
U.S. Cl. 137—525                                    5 Claims

ABSTRACT OF THE DISCLOSURE

A check valve includes a tubular housing provided with an inlet at one end and an outlet at the other end. A hollow valve seat is provided in the housing and has an open end which is sealingly secured to the housing in the region of the outlet. A mantle extends toward the inlet at least partially spaced from the housing and is provided with at least one ring of apertures distributed around the circumference of the mantle. An elastic valve member is received in and normally overlies the mantle of the valve seat.

---

Figure 1:
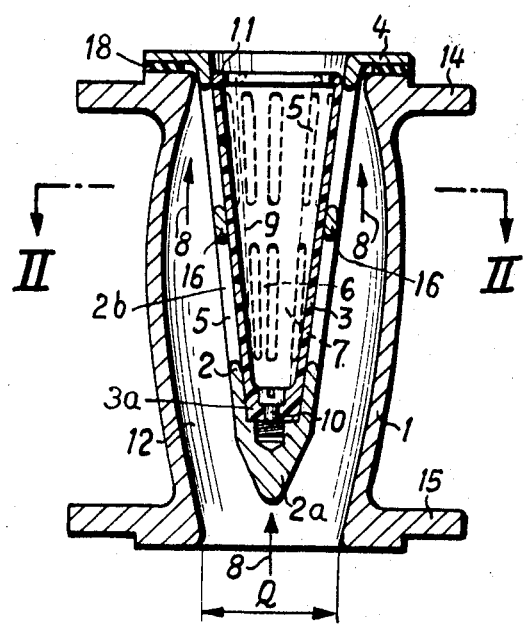

The present invention relates to check valves or one-way valves in general, and more particularly to improvements in check valves of the type wherein the valve member consists of elastic material.

It is already known to provide a check valve with a hollow or channeled torpedo-shaped valve seat which is surrounded by an elastic valve member. The fluid flows outwardly through the torpedo-shaped seat and stretches the valve member so that it can escape through the outlet of the check valve. As soon as the pressure at the outer side of the valve member equals or exceeds the pressure at the inlet, the valve member contracts and prevents further outflow of fluid. The valve member must be subjected to at least some initial expanding stresses, even at the time when the fluid pressure at the inlet is zero, and its resistance to further expansion increases in response to increased rate of fluid flow. Thus, such check valves offer relatively strong resistance to the flow of fluid and are not suitable for use in pipe lines wherein a check valve must respond to very low pressures in a sense to permit the flow of fluid in a desired direction.

Accordingly, it is an important object of my present invention to provide a very simple, compact, inexpensive and easy-to-install check valve which is constructed and assembled in such a way that it invariably prevents the flow of liquid or gaseous fluid in a first direction but permits the flow of fluid in the opposite direction as soon as the fluid pressure at the inlet exceeds only slightly the pressure at the outlet.

Another object of the invention is to provide a check valve with an elastically deformable valve member which is constructed, configurated and mounted in such a way that its resistance to the flow of fluid in a desired direction need not increase or increases only negligibly in response to increasing fluid pressure and/or in response to increasing rate of fluid flow.

A further object of the invention is to provide a check valve wherein the elastically deformable valve member may be readily removed for the purposes of inspection, cleaning and/or repair.

Still another object of my instant invention is to provide a check valve which may be used with equal advantage in pipe lines and other types of conduits which convey a liquid or a gaseous medium, and wherein the useful life of the elastically deformable valve member exceeds considerably the useful life of elastic valve members in conventional check valves.

An additional object of the invention is to provide a novel valve seat and a novel elastically deformable valve member for use in a check valve of the above outlined characteristics.

A concomitant object of the invention is to provide a check valve which embodies the above outlined features and advantages and which can be readily installed in existing pipe lines and other types of conduits without necessitating any, or by necessitating only negligible, alterations in the construction of such conduits.

A further object of the invention is to provide a check valve which is particularly suited for use in pipe lines for transport of large quantities of liquid or gaseous Briefly stated, one feature of my invention resides in the provision of a check valve comprising a tubular housing or casing having a fluid-admitting inlet at one end and a fluid-discharging outlet at the other end thereof, a hollow valve seat provided in the housing and having an open end sealingly secured to the housing in the region of the outlet and a foraminous mantle extending toward the inlet and being at least partially spaced from the housing so that its apertures communicate with the inlet, and an elastic valve member received in and normally overlying the mantle of the valve seat. The valve member is deformed and moves radially inwardly and away from the mantle when the fluid pressure at the inlet exceeds the pressure at the outlet so that the fluid may flow from the inlet, through the apertures of the mantle, around the valve member, and through the outlet.

The valve member and the valve seat preferably resemble hollow cones whose diameters diminish in a direction toward the inlet of the housing. In such check valves, the apex of the valve member may be detachably affixed to the apex of the valve seat by a threaded fastener or the like which is accessible through the outlet and through the interior of the valve member.

The valve member preferably consists of soft rubber or other elastomeric material so that it offers very little resistance to the flow of fluid from the inlet to the outlet of the housing. Instead of being compelled to expand (i.e., to store energy) when the fluid flows from the inlet toward the outlet, the valve member is caused to collapse by moving inwardly and away from the internal surface of the mantle.

Figure 2:
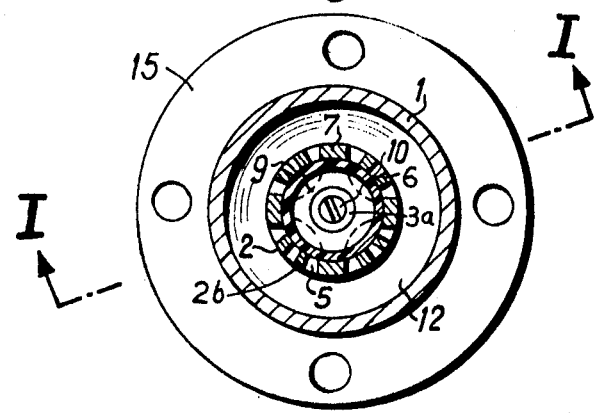

The novel features which are considered as characteristic of the invention are set forth in particular in the appended claims. The improved check valve itself, however, both as to its construction and its mode of operation, together with additional features and advantages thereof, will be best understood upon perusal of the following detailed description of a specific embodiment with reference to the accompanying drawing, in which:

FIG. 1 is an axial section through a check valve which embodies my invention, the section being taken in the direction of arrows as seen from the line I—I of FIG. 2; and FIG. 2 is a transverse section as seen in the direction of arrows from the line II—II of FIG. 1.

Referring to the drawing, the improved check valve comprises a tubular and preferably barrel-shaped valve housing or casing 1 having a first annular flange 14 at its fluid-discharging outlet end and a second annular flange 15 at the fluid-admitting inlet end. The two flanges may be connected to axially spaced sections of a pipe line or another conduit, not shown. The interior of the housing 1 accommodates a hollow conical basket-shaped valve seat 2 which includes a foraminous mantle 2b having a closed apex or tip 2a adjacent to the inlet and an open end provided with a radially outwardly extending collar 4 which overlies the exposed end face of the flange 14 at the outlet end of the housing. The cross-sectional area of the mantle 2b diminishes in a direction from the outlet toward the inlet of the housing 1. The parts 1 and 2 preferably consist of suitable metallic material and define between themselves an annular fluid-accommodating chamber 12 which communicates with the inlet but is normally sealed from the outlet of the housing. The cross-sectional area of the chamber 12 diminishes in a direction toward the collar 4. The admission of fluid takes place in the direction indicated by arrows 8. The outer side of the flange 14 is formed with an annular platform which abuts against one side of an elastic annular gasket 18. This gasket prevents leakage of fluid between the housing 1 and the collar 4. When the flange 14 is attached to the adjoining downstream section of the pipe line, the gasket 18 is automatically compressed by the collar 4, but it is equally possible to provide separate fasteners which maintain the gasket in compressed condition.

The internal surface of the mantle 2b of the hollow valve member 2 abuts against the peripheral surface of a hollow conical valve member or diaphragm 3 which consists of soft rubber or other suitable elastomeric material. The valve member 3 is without perforations and its apex or tip 3a is reinforced, i.e., its thickness exceeds the thickness of the remainder of the valve member. A screw 10 or a similar fastener is provided to secure the apex 3a to the solid tip 2a of the mantle 2b. The screw 10 can be removed by resorting to a relatively long screwdriver so that the valve member 3 may be readily withdrawn from the interior of the seat 2 when it requires inspection, replacement or cleaning. It can be said that the valve member 3 is telescoped into the seat 2, and the member 3 retains its conical shape until the fluid pressure at the outlet of the housing 1 at least equals the pressure at the inlet. The open larger-diameter end of the valve member 3 is stiffened by an inwardly extending annular bead 11.

The mantle 2b of the valve seat 2 is provided with a substantial number of suitably distributed and configurated apertures here shown as elongated slots 5 which extend in the axial direction of the housing 1 and form two rings one of which is adjacent to the bead 11 and the other of which is adjacent to the screw 10. The slots 5 of each ring are separated from each other by relatively narrow ribs 6 and by relatively wide ribs 7. An annular partition 16 of considerable width separates the two rings or sets of slots 5 from each other. It will be noted that the elastic valve member 3 overlies each of the slots 5 when the valve member is allowed to remain in sealing position which is shown by solid lines. In the illustrated embodiment, the slots 5 of each ring of slots are separated from each other by a total of twelve ribs including four equidistant ribs 7 and eight ribs 6, two between each pair of adjoining ribs 7. It is clear, however, that the mantle 2b may be formed with a single ring of slots 5, with three or more rings of such slots, and/or that the slots may be replaced by other types of apertures such as circular perforations, polygonal perforations and others.

When the pressure of a fluid, which enters and flows through the chamber 12 in the direction indicated by arrows 8, exceeds the pressure in the interior of the valve member 3, the latter yields with a minimum of resistance and allows such fluid to pass through the slots 5 and around the valve member so that it enters the downstream section of the pipe line. Due to the provision of four equidistant relatively wide ribs 7 for each ring of slots 5, the valve member 3 is deformed in such a way that its cross-sectional outline assumes a cruciform shape as indicated by the broken lines 9. Thus, the valve member 3 defines with the internal surface of the mantle 2b four axially extending channels which are separated from each other by the ribs 7. The bead 11 is also deformed and allows such fluid to pass through the collar 4. Since the valve member 3 is preferably strongly elastic, only a very small pressure differential suffices to deform it to the extent necessary to permit practically unobstructed flow of fluid to the downstream section of the pipe line.

In accordance with a feature of my invention, the combined cross-sectional area of slots 5 at least equals but preferably exceeds the cross-sectional area of the inlet to the chamber 12. The diameter Q of the inlet approximates or equals the internal diameter of the upstream section of the pipe line and also the internal diameter of the downstream section of the same pipe line. In other words, the check valve of my invention can be used with advantage between two sections of a pipe line whose internal diameters equal the diameter Q of the inlet to the housing 1. Very satisfactory results can be obtained if the combined cross-sectional area of the slots 5 exceeds by at least 50 percent the cross-sectional area of the inlet. Also, the axial length of the elastic valve member 3 and of the mantle 2b is preferably a multiple of the diameter Q, i.e., such axial length at least equals the combined length of two diameters Q.

When the pressure of fluid in the chamber 12 decreases, the valve member 3 returns into full abutment with the internal surface of the mantle 2b and seals the downstream section of the pipe line from the slots 5. The pressure in the interior of the valve member 3 may exceed the pressure in the chamber 12 without affecting the sealing action of the valve member; at the very worst, certain portions of the valve member will bulge outwardly and will extend into the slots 5.

It is clear that the check valve of my invention may be provided with a valve member 3 and with a mantle 2b which need not be of truly conical shape and which may be of oval or polygonal cross sectional outline. For example, each of these parts may resemble a pyramid or a cylinder. However, a conical valve seat has been found to be of particular advantage because it offers very little resistance to inflowing fluid. The number of wider ribs 7 for each ring of slots 5 may be less or more than four, e.g., the slots 5 of each ring may be separated by ribs which include only two wide ribs 7 located diametrically opposite each other. In such constructions, the cross-sectional outline of the deformed or collapsed valve member 3 will resemble a rectangle, an ellipse or another non-cruciform body.

It is further clear that the check valve of my invention may be used in pipe lines and other types of conduits which convey a liquid or a gaseous fluid. Its resistance to flow of a gaseous or liquid fluid in a direction from the inlet toward the outlet of the houisng 1 is much lower than the resistance of all check valves which are known to me at this time. The check valve of my invention has been found to be particularly suitable for use in pipe lines wherein a very large quantity of fluid must flow per unit of time, for example, in pipe lines wherein a liquid flows at the rate of 50–250 liters per minute.

If its material is sufficiently soft, the valve member 3 may resemble a solid cone whose apex is glued, welded or otherwise affixed to the apex 2 of the mantle 2b.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of tthe following claims.

What is claimed as new and desired to be secured by Letters Patent is:

1. A check valve, comprising a tubular housing having a fluid-admitting inlet at one end and a fluid-discharging outlet at the other end thereof; a hollow valve seat in said housing, said valve seat having an open end sealingly secured to the housing in the region of said outlet and a mantle provided with at least one ring of apertures and ribs of greater and lesser width located between and separating respective adjacent ones of said apertures, said mantle extending toward said inlet and being at least partially spaced from said housing; and an elastic valve member received in and normally overlying the mantle of said valve seat in elastic engagement therewith so as to be subjected in the region of the ribs of lesser width to pressure by fluid entering through said apertures while being protected against such pressure in the region of said ribs of greater width by engagement with the same so that, yielding to the pressure in the region of said ribs of lesser width, said valve member is deformed in the region of said ribs of lesser width when the fluid pressure at said inlet exceeds the pressure at said outlet, thereby enabling the fluid to pass through said apertures in said mantle and around said valve member.

2. A check valve as defined in claim 1, wherein said ribs are uniformly distributed around the circumference of said mantle.

3. A check valve as defined in claim 1, wherein said mantle comprises at least one rib of lesser width between each pair of adjacent ribs of greater width.

4. A check valve comprising a tubular outer member having a fluid-admitting inlet at one end and a fluid discharging outlet at the other end therefor; a hollow conical cage in said housing member having a mantle and an annular collar, said collar being sealingly secured to the housing in the region of said outlet, the mantle of said cage being provided with a plurality of apertures distributed around the circumference of said mantle; ribs in said mantle located between and separating respective adjacent ones of said apertures, said ribs being of greater and lesser width; the diameter of said mantle diminishing in a direction toward said inlet and said mantle having an apex axially distant from said outlet in direction of said inlet; a elastically deformable hollow conical valve member inside said mantle and normally overlying said apertures, said valve member having an apex adjacent to the apex of said mantle and being deformed inwardly and away from the mantle when the fluid pressure at said inlet exceeds the pressure at said outlet so that the fluid can pass through said apertures in direction to said outlet, whereby said valve member is deformed inwardly mainly in the region of said ribs of lesser width; and fastener means securing the apex of said valve member to the apex of said mantle.

5. A check valve as set forth in claim 4, wherein the apertures in said mantle are slots extending in longitudinal direction of said cage, and wherein the total area of said slots exceeds the cross-sectional area of said inlet.

References Cited

UNITED STATES PATENTS

| 2,236,477 | 3/1941 | Fuchs | 137—525 |
| 2,657,899 | 11/1953 | Kohler | 137—525 |
| 2,902,499 | 9/1959 | Ilfrey | 137—525 |
| 2,910,093 | 10/1959 | Dahl | 137—525 X |
| 3,022,796 | 2/1962 | Cummings | 137—525 X |

FOREIGN PATENTS

| 218,988 | 2/1910 | Germany. |
| 90,275 | 8/1957 | Norway. |

WILLIAM F. O'DEA, *Primary Examiner.*

W. H. WRIGHT, *Assistant Examiner.*

U.S. Cl. X.R.

137—512.15, 516.11, 525.3